United States Patent
Mayoue et al.

(10) Patent No.: US 11,041,801 B2
(45) Date of Patent: Jun. 22, 2021

(54) METHOD FOR ESTIMATING A QUANTITY OF A GASEOUS SPECIES

(71) Applicant: ELICHENS, Grenoble (FR)

(72) Inventors: Aurélien Mayoue, Soisy-sur-Seine (FR); Chakib Belafdil, Avignon (FR)

(73) Assignee: ELICHENS, Grenoble (FR)

(*) Notice: Subject to any disclaimer, the term of this patent is extended or adjusted under 35 U.S.C. 154(b) by 5 days.

(21) Appl. No.: 16/622,703

(22) PCT Filed: Jun. 14, 2018

(86) PCT No.: PCT/EP2018/065907
§ 371 (c)(1),
(2) Date: Dec. 13, 2019

(87) PCT Pub. No.: WO2018/229239
PCT Pub. Date: Dec. 20, 2018

(65) Prior Publication Data
US 2020/0116629 A1    Apr. 16, 2020

(30) Foreign Application Priority Data
Jun. 15, 2017 (FR) .................................. 1755429

(51) Int. Cl.
G01N 21/3504 (2014.01)
G01N 21/27 (2006.01)
G01N 21/31 (2006.01)

(52) U.S. Cl.
CPC ....... G01N 21/3504 (2013.01); G01N 21/274 (2013.01); G01N 21/314 (2013.01); G01N 2201/121 (2013.01)

(58) Field of Classification Search
CPC ............. G01N 21/314; G01N 21/274; G01N 2291/021; G01N 21/3504
See application file for complete search history.

(56) References Cited

U.S. PATENT DOCUMENTS

| | | | |
|---|---|---|---|
| 5,026,992 A | 6/1991 | Wong | |
| 10,180,353 B2* | 1/2019 | Liu | ........................... G01J 3/28 |
| 2017/0059477 A1* | 3/2017 | Feitisch | ............... G01N 21/274 |

FOREIGN PATENT DOCUMENTS

| | | |
|---|---|---|
| EP | 1408325 A2 | 4/2004 |
| WO | 2007064370 A2 | 6/2007 |
| WO | 2016145066 A1 | 9/2016 |

OTHER PUBLICATIONS

International Search Report for International Application PCT/EP2018/065907, dated Jul. 25, 2018, 7 pages (including English translation).

(Continued)

*Primary Examiner* — David P Porta
*Assistant Examiner* — Fani Boosalis
(74) *Attorney, Agent, or Firm* — TraskBritt (57) ABSTRACT

A method for measuring a quantity of a gaseous species—present in a gas and able to absorb light in an absorption spectral band—comprises: arranging the gas between a light source and a measurement photodetector, the light source being suitable for emitting an incident light wave propagating through the gas to the measurement photodetector, which is suitable for detecting a light wave transmitted by the gas, in the absorption spectral band; illuminating the gas by the light source; measuring, by the measurement photodetector, a measurement intensity of the light wave transmitted by the gas, in the absorption spectral band; measuring, by a reference photodetector, a reference intensity of a reference light wave being emitted by the light source. The method comprises a correction of the reference intensity by consideration of a parametric model, the parameters of the model being determined according to reference intensity measurements performed at various times.

10 Claims, 5 Drawing Sheets

(56) References Cited

OTHER PUBLICATIONS

International Search Report for International Application PCT/EP2018/065907, dated Jul. 25, 2018, 11 pages (including English translation).
Ye et al., Design and Performance of a Mid-infrared CH4 Detection Device with Novel Three-Channel-Based LS-FTF Self-Adaptive Denoising Structure, Sensors and Actuators B: Chemical, vol. 155 (2011), 37-45.

* cited by examiner

METHOD FOR ESTIMATING A QUANTITY OF A GASEOUS SPECIES

CROSS-REFERENCE TO RELATED APPLICATIONS

This application is a national phase entry under 35 U.S.C. § 371 of International Patent Application PCT/EP2018/065907, filed Jun. 14, 2018, designating the United States of America and published in French as International Patent Publication WO 2018/229239 A1 on Dec. 20, 2018, which claims the benefit under Article 8 of the Patent Cooperation Treaty to French Patent Application Serial No. 1755429, filed Jun. 15, 2017.

TECHNICAL FIELD

The technical field of the present disclosure is the use of a light source, in particular a black body or gray body, to perform optical measurements, with a temporal drift affecting the light radiation emitted by the light source taken into account.

BACKGROUND

Optical methods are frequently used to analyze a gas. Some devices allow the composition of a gas to be determined on the basis of the fact that the species from which the gas is composed have absorption spectral properties that are different from one another. Thus, if the absorption spectral band of a gaseous species is known, its concentration may be determined via an estimation of the absorption of light passing through the gas, using the Beer-Lambert law. This principle allows the concentration of a gaseous species present in the gas to be estimated.

The light source is usually a source emitting in the infrared, the method used conventionally being referred to as NDIR detection, the acronym NDIR meaning "non-dispersive infrared." Such a principle has frequently been employed, and is, for example, described in documents U.S. Pat. No. 5,026,992 or WO2007064370.

In the commonest methods, the analyzed gas lies between a light source and a photodetector, called the measurement photodetector, the latter being intended to measure a light wave transmitted by the gas to be analyzed, the light wave being partially absorbed by the latter. These methods generally comprise a measurement of a light wave, called the reference light wave, emitted by the source, the reference light wave not being absorbed, or being absorbed negligibly, by the analyzed gas.

Comparison of the light wave in the presence of gas and the light wave without gas allows the absorption of the gas to be characterized. It is, for example, a question of determining an amount of a gaseous species in the gas, using the technology referred to as "absorption NDIR." It may also be a question of estimating a number of particles in the gas, by detecting light scattered by the latter in a preset angular range of scatter.

The reference light wave is measured by a reference photodetector. It may be a reference photodetector different from the measurement photodetector, and arranged so as to be placed facing the light source, the reference photodetector being associated with a reference optical filter. The reference optical filter defines a reference spectral band, in which the gas to be analyzed exhibits no significant absorption. The publication Wei-Lin Ye, et al., "Design and performances of a mid-infrared $CH_4$ detection device with novel three-channel-based LS-FTF self-adaptive denoising structure," Sensors and Actuators B: Chemical, volume 155, issue 1, describes such a method. In this publication an algorithm for denoising a signal emitted by the reference photodetector is described. The denoising algorithm is also applied to the signal resulting from the measurement photodetector.

The inventors have proposed an improvement to existing methods and devices. Specifically, the reference photodetector is frequently affected by measurement noise, which has an impact on the estimation of the intensity of the reference light wave. This is, in particular, the case when the reference photodetector is a simple and inexpensive photodetector. Such noise may lead to uncertainty in the estimated amounts. Embodiments of the present disclosure aim to decrease this uncertainty, by limiting the effect of the fluctuations affecting the measurements carried out by the reference photodetector.

BRIEF SUMMARY

A first subject of the present disclosure is a method for measuring an amount of a gaseous species present in a gas, the gaseous species being able to absorb light in an absorption spectral band, the method comprising the following steps:
  a) placing the gas between a light source and a measurement photodetector, the light source being able to emit an incident light wave, the incident light wave propagating through the gas toward the measurement photodetector, the measurement photodetector being able to detect a light wave transmitted by the gas, in the absorption spectral band;
  b) illuminating the gas with the light source;
  c) measuring, with the measurement photodetector, an intensity, called the measurement intensity, of the light wave transmitted by the gas, in the absorption spectral band; and
  d) measuring, with a reference photodetector, an intensity, called the reference intensity, of a light wave, called the reference light wave, the reference light wave being emitted by the light source;
  steps b) to d) being implemented at a plurality of measurement times, the method also comprising the following steps:
  e) correcting the reference intensity detected at the various measurement times; and
  f) estimating an amount of the gaseous species, at the various measurement times, from the corrected reference intensity and from the measurement intensity;
  the method being characterized in that step e) comprises the following substeps:
    ei) taking into account a parametric model, defined using parameters, describing a temporal variation in the reference intensity detected at the various measurement times;
    eii) estimating the parameters of the model using the reference intensities measured at the various measurement times; and
    eiii) estimating a reference intensity called the denoised reference intensity at each measurement time depending on the estimated parameters of the model.

The reference light wave is representative of a light wave that reaches the measurement photodetector without having been absorbed by the gas. It lies in a reference spectral band. Depending on the configuration, the reference spectral band may be separate from or none other than the absorption spectral band.

In step ei), the model taken into account may, in particular, be a linear model, step eii) forming a linear regression.

According to one embodiment, steps b) to d) are carried out at various measurement times forming a time range, and, following these measurement times:

in sub step ei), the model is determined for the time range;

in sub step eii), the parameters of the model are estimated using reference measurements carried out during the time range; and in substep eiii), the reference light intensity is corrected for the measurement times of the time range.

In this embodiment, in sub step eii), each time of the time range may be assigned a weighting term that is strictly positive and lower than or equal to 1.

According to another embodiment, sub steps eii) and eiii) are implemented at each measurement time, iteratively, the parameters of the model being updated depending on parameters of the model resulting from a preceding iteration, or, at a first measurement time, depending on initialized parameters. According to this embodiment, steps e) and f) may be implemented at each measurement time. Sub step eii) may take into account a forgetting factor to weight to what extent the preceding iteration is taken into account.

The model may comprise a weighting term that is strictly positive and lower than or equal to 1.

Whatever the embodiment, step f) may comprise the following sub steps:

fi) from the corrected reference intensity, at each measurement time, estimating an intensity of the light wave emitted by the light source, in the absorption spectral band, at the measurement time;

fii) comparing the intensity thus estimated with the measurement intensity resulting from step c), at the measurement time; and fiii) estimating the amount of the gaseous species depending on the comparison carried out in substep fii). This comparison may take the form of a ratio.

Another subject of the present disclosure is a device for determining an amount of a gaseous species in a gas, the device comprising:

a light source able to emit an incident light wave that propagates toward the gas, the incident light wave lying in an absorption spectral band of the gaseous species;

a measurement photodetector able to detect a light wave transmitted by the gas, at various measurement times, and to measure an intensity thereof called the measurement intensity;

a reference photodetector configured to measure an intensity, called the reference intensity, of a reference light wave emitted by the light source, at the various measurement times;

a first processor, for computing a corrected reference intensity at the various measurement times, from the reference intensity measured by the reference photodetector at the measurement times, the first processor being configured to implement step e) of the method according to the first subject of the present disclosure; and a second processor, for estimating the amount of the gaseous species, at each measurement time, depending on the corrected reference intensity and the measurement intensity. The second processor may, in particular, be configured to implement step f) of the method according to the first subject of the present disclosure.

The first and second processors may be merged and form a single processor.

Other advantages and features will become more clearly apparent from the following description of particular embodiments of the present disclosure, which are given by way of nonlimiting example, and shown in the figures listed below.

DETAILED DESCRIPTION

Figure 1:
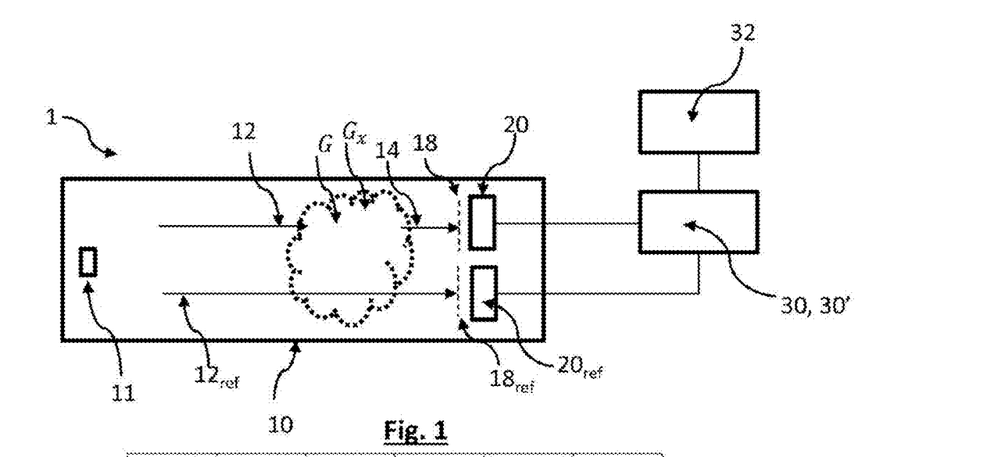
FIG. 1 shows a device allowing the present disclosure to be implemented.

FIG. 1 is an example of a device 1 for analyzing gas. This device comprises a chamber 10 defining an internal space inside of which are located:

a light source 11, able to emit a light wave 12, called the incident light wave, so as to illuminate a gas G lying in the internal space; and a photodetector 20, called the measurement photodetector, able to detect a light wave 14 transmitted by the gas G, under the effect of the illumination of the latter by the incident light wave 12. The light wave 14 is referred to by the term measurement light wave.

The gas G contains a gaseous species $G_x$ an amount $c_x(k)$ of which, a concentration of which, for example, it is sought to determine at a measurement time k. This gaseous species absorbs a measurable percentage of the light in an absorption spectral band $\Delta_x$.

The light source 11 is able to emit the incident light wave 12, in an illumination spectral band $\Delta$, the latter possibly lying between the near ultraviolet and the mid infrared, between 200 nm and 10 μm, and most often between 1 μm and 10 μm. The absorption spectral band $\Delta_x$ of the analyzed gaseous species is comprised in the illumination spectral band $\Delta$. The light source 11 may, in particular, be pulsed, the incident light wave 12 being a pulse of duration generally comprised between 100 ms and 1 s. The light source 11 may, in particular, be a suspended filament light source heated to a temperature comprised between 400° C. and 800° C. The measurement photodetector 20 is preferably associated with an optical filter 18, defining a detection spectral band encompassing all or some of the absorption spectral band $\Delta_x$ of the gaseous species.

In the example in question, the measurement photodetector 20 is a thermopile, able to deliver a signal dependent on the intensity of the light wave to which the photodetector is exposed. It may also be a question of a photodiode or of another type of photodetector.

The intensity $I(k)$ of the light wave 14 detected by the measurement photodetector 20, called the measurement intensity, at a measurement time k, depends on the amount $c_x(k)$ at the measurement time, according to the Beer-Lambert equation:

$$att(k) = \frac{I(k)}{I_x(k)} = e^{-\mu(c_x(k))l} \quad (1)$$

where:
- $\mu(c_x(k))$ is an attenuation coefficient dependent on the amount $c_x(k)$ at the time k;
- l is the thickness of gas passed through by the light wave in the chamber 10; and
- $I_x(k)$ is the intensity of the incident light wave, at the time k, which corresponds to the intensity of the light wave, in the absorption spectral band $\Delta_x$, reaching the measurement photodetector 20 in the absence of absorbent gas in the chamber.

The comparison between I(k) and $I_x(k)$, taking the form of a ratio $$\frac{I(k)}{I_x(k)},$$

corresponds to an attenuation att(k) generated by the gaseous species in question at the time k.

During each pulse of the light source 11, it is thus possible to determine $\mu(c_x(k))$, this allowing $c_x(k)$ to be estimated given that the relationship between $c_x(k)$ and $\mu(c_x(k))$ is known.

Expression (1) assumes control of the intensity $I_x(k)$ of the incident light wave 12 at the measurement time k. However, it is known that the emissivity of light sources, of blackbody and gray-body type, varies over time, and may, in particular, undergo a decrease. In order to take into account this temporal variation in the emission of the light source 11, the device comprises a reference photodetector $20_{ref}$, arranged such that it detects a light wave, called the reference light wave $12_{ref}$, representative of the incident light wave 12 emitted by the light source 11. The reference light wave $12_{ref}$ reaches the reference photodetector $20_{ref}$ without interacting with the gas G, or without significantly interacting with the latter. The intensity of the reference light wave $12_{ref}$, detected by the reference photodetector $20_{ref}$, at the measurement time k, is referred to by the term reference intensity $I_{ref}(k)$. The reference light wave lies in a reference spectral band $\Delta_{ref}$.

In this example, the reference photodetector $20_{ref}$ is placed beside the measurement photodetector 20 and is of the same type as the latter. It is associated with an optical filter, called the reference optical filter $18_{ref}$. The reference optical filter $18_{ref}$ defines the reference spectral band $\Delta_{ref}$ corresponding to a range of wavelengths not absorbed by the gaseous species in question. The reference spectral band $\Delta_{ref}$ is, for example, centered on the wavelength 3.91 μm.

Various configurations, known from the prior art, may also be envisioned, in particular, variants in which:
- the reference photodetector $20_{ref}$ is placed in a chamber isolated from the gas to be analyzed; in this case, the reference spectral band $\Delta_{ref}$ may be none other than the absorption spectral band $\Delta_x$; and
- the reference photodetector $20_{ref}$ is none other than the measurement photodetector 20, a filter-adjusting means allowing the photodetector to be alternately associated with the measurement filter 18 and with the reference optical filter $18_{ref}$. It may, for example, be a question of a filter wheel. When the reference photodetector is none other than the measurement photodetector, the reference spectral band $\Delta_{ref}$ is preferably separate from the absorption spectral band $\Delta_x$.

In prior-art devices, measurement of $I_{ref}(k)$ allows expression (1) to be used with $I_x(k)$ estimated from $I_{ref}(k)$, this allowing $\mu(c_x(k))$ to be determined, then $c_x(k)$ to be estimated.

The reference photodetector $20_{ref}$ may be affected by a large amount of read noise, impacting the precision of the determination of the reference intensity $I_{ref}(k)$. The reference intensity is thus subject to statistical fluctuations, this resulting in a high measurement uncertainty that has an impact on the estimation of the amount $c_x(k)$ of the gaseous species. The present disclosure addresses this problem, by correcting the reference intensity $I_{ref}(k)$ measured at each measurement time. More precisely, the correction consists in replacing the reference intensity $I_{ref}(k)$, measured at each measurement time, with an estimation $I'_{ref}(k)$ of the reference intensity called the denoised estimation. By denoised, what is meant is less subject to fluctuations than the reference intensity measured by the reference photodetector. $I'_{ref}(k)$ corresponds to the corrected reference intensity.

To this end, the device comprises a first processor 30, for example, a microprocessor or a microcontroller. The latter is configured to receive a signal representative of the intensity $I_{ref}(k)$ of the reference light wave $12_{ref}$, measured by the reference photodetector $20_{ref}$ at each measurement time k, and to implement a method in order to obtain a corrected reference intensity $I'_{ref}(k)$. The correcting method is described below, with reference to FIGS. 4A to 4D. The first processor 30 is connected to a memory 32 containing instructions allowing certain steps of this method to be implemented. The first and second processors may be one and the same processor.

The device also comprises a second processor 30' configured to receive a signal representative of a measurement intensity I(k) and the corrected reference intensity $I'_{ref}(k)$. The second processor is programmed to determine, depending on these intensities, the amount of the gaseous species measured at each measurement time.

Devices such as that shown in FIG. 1 have been employed to measure a concentration of carbon dioxide. The optical filter 18 defined a detection spectral band of 160 nm width about the wavelength 4.26 μm. Four devices were used, using light sources raised to different potentials V1, V2, V3 and V4, with V1>V2>V3>V4, respectively. The variation, over time, in the reference intensity $I_{ref}$ and in the measurement intensity I were measured. The measurements were carried out at various times k, between an initial time k=0 and a time k=K, with K=2.6×10⁷. The index k is a temporal index, and designates a light pulse emitted at a measurement time k. These measurements allowed the aging of the light source 11 to be observed during a time range of 2.6×10⁷ pulses, i.e., 2166 hours, or about 90 days. Each light pulse had a duration of 150 ms, the pulse frequency being one pulse every 300 ms, i.e., 1/0.3 Hz. The measurement photodetector 20 and the reference photodetector $20_{ref}$ were formed by a Heimann Sensor thermopile of reference HCM Cx2 Fx. The measured intensity of each pulse is here expressed in units of voltage, corresponding to the voltage across the terminals of the thermopile.

Figure 2A:
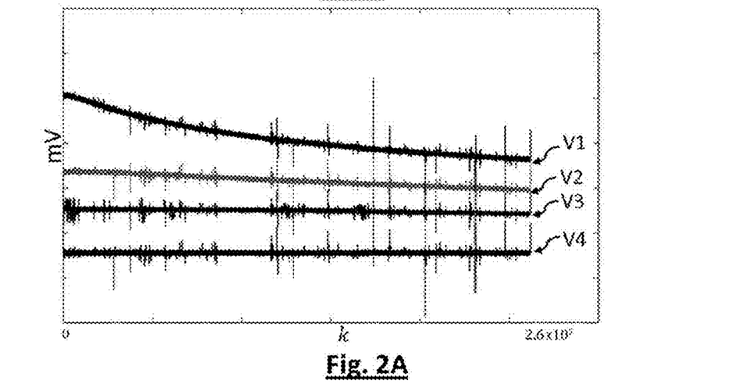
FIGS. 2A and 2B illustrate a variation in the reference light intensities and measurement light intensities measured by a reference photodetector and a measurement photodetector of a device, such as shown in FIG. 1, respectively, in various configurations.

FIG. 2A shows the measurements of the intensity $I_{ref}$ of the reference light wave detected, in each configuration, by the reference photodetector. It may be seen that the higher the potential to which the light source 11 was raised, the greater the gradual decrease in the intensity of the reference light wave $12_{ref}$, between an initial value $I_{ref}(k=0)$ and a final value $I_{ref}(k=K)$. This effect is particularly visible in the curves corresponding to the highest potentials V1 and V2. Whatever the potential of the source, substantial fluctuations affecting the reference intensity measured by the reference photodetector were also observed.

Figure 2B:
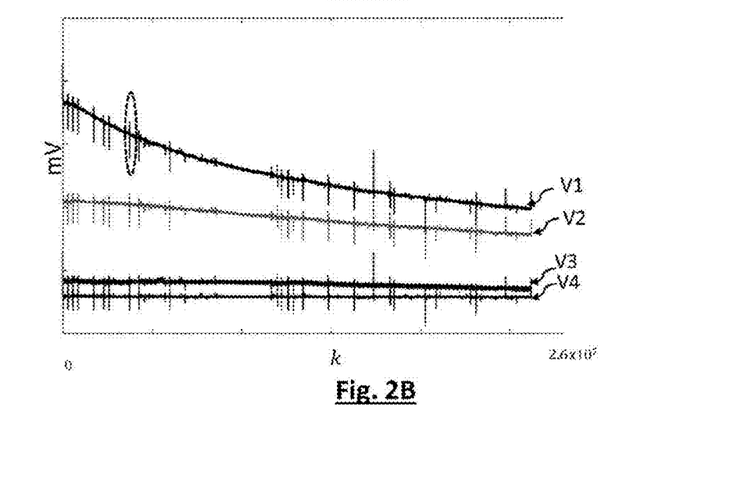

FIG. 2B shows the temporal variation in the measurement intensity I detected, in each configuration, by the measurement photodetector 20. The gradual aging of the light source 11 may also be seen, this resulting in a decrease in the measurement intensity between the initial time k=0 and the final time k=K. These trials were carried out for the most part by analyzing ambient air, the carbon-dioxide concentration being the ambient concentration $C_{amb}$. A few series of point measurements were carried out while the carbon-dioxide concentration was varied. These point measurements resulted in the fluctuations that may be seen in the curves of FIG. 2B. One of these fluctuations has been encircled by a dashed line and is detailed in FIG. 2C. During the series of measurements shown in FIG. 2C, the carbon-dioxide concentration was successively changed to C0=0%, then to the concentrations C1=500 ppm, C2=1000 ppm, C3=1500 ppm, C4=2000 ppm, C5=3000 ppm, then back to the concentration C0. When the concentration passed from ambient concentration $C_{amb}$ (about 400 ppm) to C0, the incident light wave 12 was less attenuated, this resulting in an increase in the measurement intensity I. The higher the carbon-dioxide concentration, the lower the measurement intensity, this resulting in plateaus corresponding to the concentrations C1 to C5, respectively. The measurement intensity delivered by the measurement photodetector corresponds to curve I of this figure. The statistical fluctuations may be decreased by applying a median filter, so as to obtain a filtered intensity $I_f$ allowing the useful information to be preserved while attenuating the main fluctuations in the measured intensity.

The gradual decrease in the measurement intensity may be corrected by taking into account the reference intensity. A compensation function comp may thus be applied to the measurement intensity, preferably after application of a median filter, such that, at each measurement time k, $$comp(I(k)) = I_f(k) - \frac{I_f(k=0)}{I_{ref,f}(k=0)} \times (I_{ref,f}(k) - I_{ref,f}(k=0)), \quad (2)$$

$I_{ref,f}$ being the reference intensity after application of a median filter to five successive samples.

Figure 3:
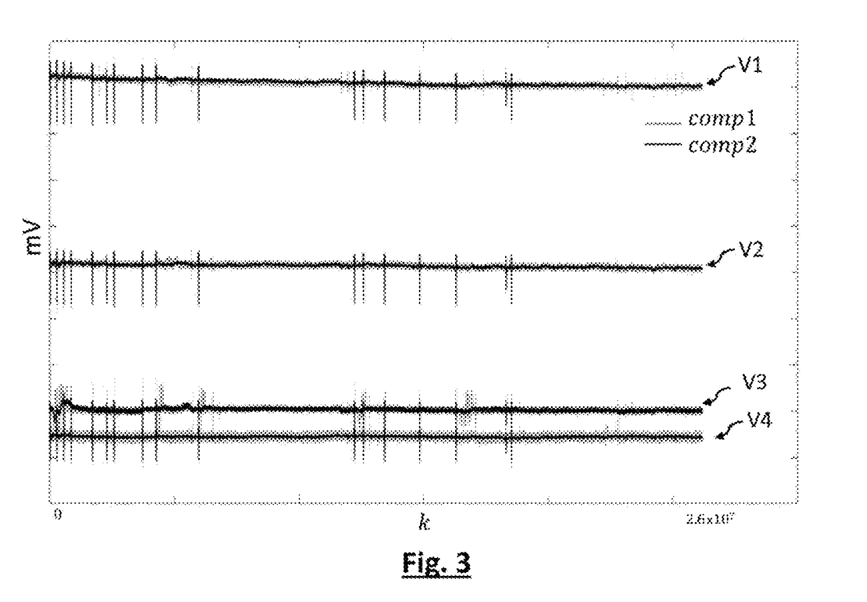
FIG. 3 shows an example of correction of the light intensity emitted by the light source.

From the curves shown in FIGS. 2A and 2B, the curves comp1 of FIG. 3, showing the measurement intensity corrected using expression (2) for each potential V1, V2, V3 and V4, were obtained. By comparing the curves comp1 to the curves shown in FIG. 2B, it may be seen that taking into account the reference intensity and applying simple filters, such as a median filter, allows the measured intensity to be effectively corrected. The curves comp2 of FIG. 3 are described below.

The inventors have sought to optimize the way in which the reference intensity is taken into account, so as to further limit the fluctuations affecting the latter. They have taken advantage of the fact that, contrary to the measurement intensity, certain fluctuations of which are due to non-modellable variations in concentrations of the analyzed gaseous species, the variation in the reference intensity may be modelled using a predetermined parametric model. If θ is a vector containing the parameters of the model, determining θ allows a denoised estimation of the reference intensity $I_{ref}$ to be obtained.

Figure 4A:
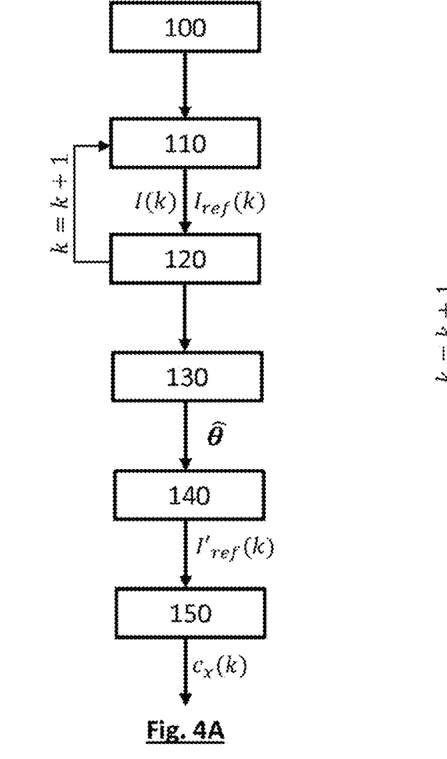
FIGS. 4A and 4B show the main steps of one embodiment of the present disclosure.
Figure 4B:
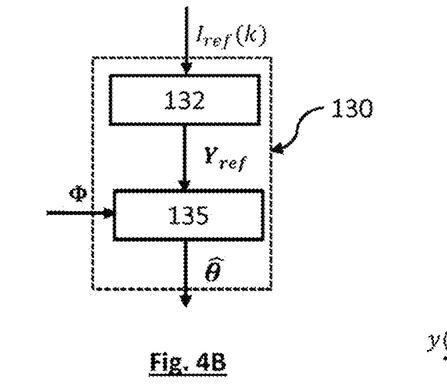

A first embodiment of the present disclosure is schematically shown in FIGS. 4A and 4B.

Step 100: selecting the model.

In this step, a parametric model is selected. In this example, the variation in the reference intensity $I_{ref}$ is based on a linear model of type $I_{ref}(k)=ak+b(3)$, where k corresponds to a time increment; and a and b are real numbers forming the vector of parameters θ.

Step 110: acquiring the measurements.

In this step, the measurement intensity I(k) and the reference intensity $I_{ref}(k)$ are acquired at each measurement time k.

Step 120: reiterating step 110 or stopping the iteration.

Step 110 is reiterated until a number $N_k$ of iterations has been reached. In this example, $N_k=K=2.6\times10^7$ iterations, this meaning that a single vector of parameters θ is formed for all of the measurements carried out. Alternatively, the vector of parameters θ of the model may be renewed more often, for example every $N_k=100000$ iterations. The decrease in the time range Δk employed to establish the vector of parameters θ may allow the uncertainty in the model with respect to the measurements to be decreased, as described below.

Step 130: estimating the vector of parameters $\hat{\theta}$.

This step is illustrated in FIG. 4B. It comprises forming a reference vector $Y_{ref}$ (substep 132) of $(N_k, 1)$ size, and each term of which corresponds to a measurement of the reference intensity $I_{ref}(k)$, such that $Y_{ref}(k)=I_{ref}(k)$. It also takes into account an observation matrix Φ, such that $$\Phi = \begin{bmatrix} 1 & 1 \\ \vdots & \vdots \\ k & 1 \\ \vdots & \vdots \\ K & 1 \end{bmatrix}$$

Φ is a matrix of $(N_k, 2)$ size, with, in this example, $N_k=K$. The first column is formed by all of the time increments k in increasing order, the second column being formed from 1's.

Since the considered model is linear, it may be written in the form of the following matrix expression:

$$Y_{ref}=\Phi\cdot\theta+\varepsilon \quad (4), \text{where:}$$

θ is the vector of parameters, of (2, 1) size, with $$\theta = \begin{bmatrix} a \\ b \end{bmatrix}$$

ε is an error vector, of $(N_k, 1)$ size.

The vector of parameters $\hat{\theta}$ may be estimated by minimizing the quadratic norm of the error vector ε, this being expressible by the following expression:

$$\hat{\theta} = \min_\theta(\varepsilon^T\varepsilon) = (\Phi^T\Phi)^{-1}\Phi^T Y_{ref} \quad (5)$$

This estimation is carried out in substep 135.

Step 140: Correcting the reference intensity.

In this step, the model is taken into account to correct the reference intensity $I_{ref}(k)$, so as to obtain a corrected reference intensity $I'_{ref}(k)$. The correction consists in replacing the reference intensity with an application of the model according to the expression:

$$I'_{ref}(k) = ak + b \quad (6), \text{ where:}$$

a and b are the terms of the vector $\hat{\theta}$.

From a matrix point of view, this amounts to forming a corrected reference vector $Y'_{ref}$ of $(N_k, 1)$ size, each term of which is $I'_{ref}(k)$, with $Y'_{ref} = \Phi\hat{\theta}(6')$.

Step 150: Estimating the amount $c_x(k)$ of the gaseous species analyzed.

This estimation is carried out by estimating, from $I'_{ref}(k)$, the intensity $I_x(k)$ reaching the measurement photodetector 20 in the absence of gas, in the absorption spectral band $\Delta_x$. The computation of the ratio $$\frac{I(k)}{I_x(k)}$$

allows the amount $c_x(k)$ to be obtained as indicated above.

Figure 5A:
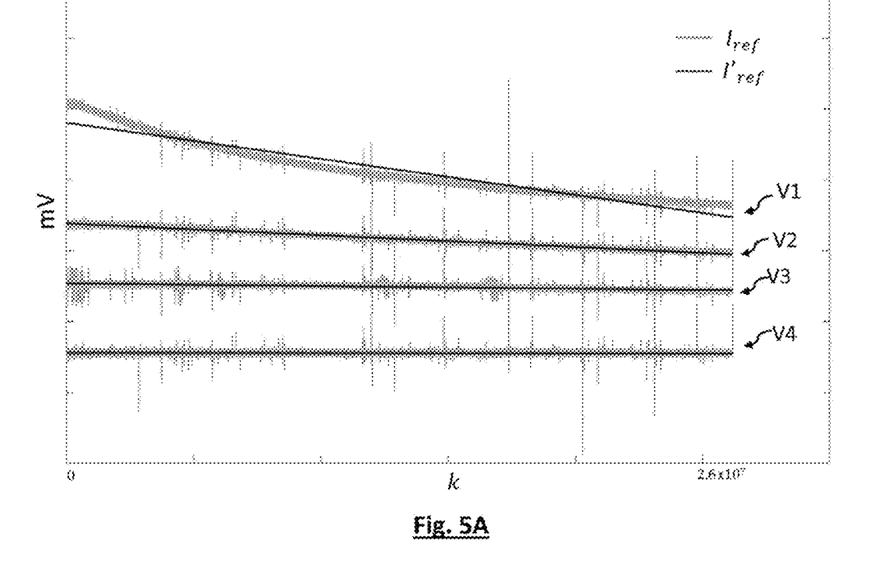
FIGS. 5A, 5B and 5C, respectively, show estimations, called denoised estimations, of the reference intensities measured by a reference photodetector, in three embodiments.

FIG. 5A shows, for various potentials to which the light source was raised, the measured reference intensity $I_{ref}$ and the reference intensity $I'_{ref}$ corrected using the method described with regard to steps 100 to 150. The corrected reference intensity $I'_{ref}$ is not subject to statistical fluctuations. In addition, in the curves corresponding to the potentials V2, V3 and V4, respectively, it describes with fidelity the temporal variation in the reference intensity $I_{ref}$. When the decrease in the reference intensity $I_{ref}$ is more pronounced, this being the case when the light source is subjected to a high potential (curve V1), the correction may be improved by decreasing the time range $\Delta k$ taken into account to establish the model. The reference intensity is then approximated by a piecewise linear model, the duration of each piece corresponding to a time range $\Delta k$. Each piece may then form the subject of an estimation of a vector of parameters, according to steps 100 to 150.

Complementarily or alternatively, the precision of the model may be improved by taking into account a weighting factor, or forgetting factor $\lambda$, associated with each time increment k, with $\lambda \in ]0,1]$, the forgetting factor preferably being comprised between 0 and 1. The forgetting factor in question allows a weighting matrix W, of $(N_k, N_k)$ size, to be formed such that:

$$W = \begin{bmatrix} \lambda^{N_k-1} & 0 & 0 \\ 0 & \lambda^{k-1} & 0 \\ 0 & 0 & \lambda^0 \end{bmatrix}$$

The weighting matrix allows an error vector $\varepsilon_W$ such that $\varepsilon_W = \varepsilon \cdot W$ to be formed. The vector of parameters $\hat{\theta}$ minimizing the error vector $\varepsilon_w$ is such that:

$$\hat{\theta} = (\Phi^T W^T W \Phi)^{-1} \Phi^T W^T W Y_{ref} \quad (7)$$

When $\lambda = 1$, equation (7) is equivalent to equation (5).

Figure 4C:
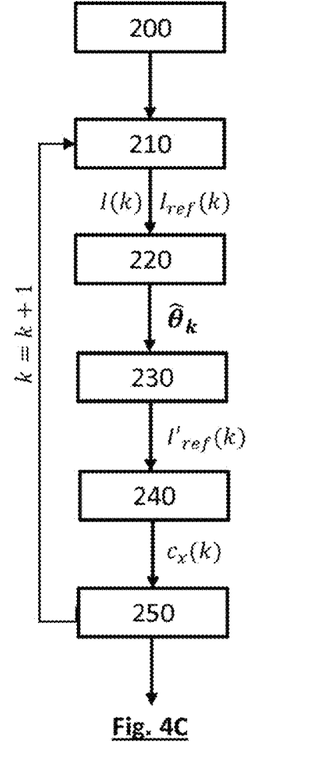
FIGS. 4C and 4D show the main steps of another embodiment of the present disclosure.
Figure 4D:
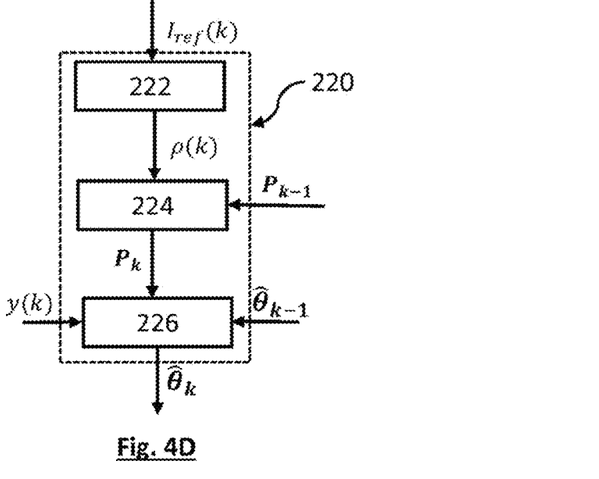

One drawback of the method described with regard to steps 100 to 150, with or without application of a weighting matrix, is that it is a question of a method applied a posteriori, after the observation vector $Y_{ref}$ has been obtained. This requires a high number of measurements to have been taken before the corrected reference intensities may be obtained. The correction of the reference intensity is therefore not carried out in real time. Another drawback is that it is necessary to perform complex matrix computations (such as those of expressions (5) or (7)) involving matrix inversions. An embodiment not having these drawbacks is illustrated in FIGS. 4C and 4D.

Step 200: Selecting the model.

This step is similar to step 100 described above. In this example, the variation in the reference intensity $I_{ref}$ is based on a linear model of the following type $$I_{ref}(k) = a_k k + b_k. \quad (8), \text{ where}$$

k corresponds to a time increment; and
$a_k$ and $b_k$ are real numbers forming the vector of parameters $$\theta_k : \theta_k = \begin{bmatrix} a_k \\ b_k \end{bmatrix}$$

With each time increment k, i.e., with each measurement time, is associated a vector of parameters $\theta_k$.

Step 210: acquiring a measurement.

In this step, the measurement intensity I(k) and the reference intensity $I_{ref}(k)$ are acquired at a measurement time k.

Step 220: Updating the vector of parameters $\theta_k$ corresponding to the measurement time k.

Unlike the method described with reference to steps 100 to 150, the vector of parameters $\theta_k$ is updated at each measurement time k, using a so-called recursive approach, employing the following expression:

$$\hat{\theta}_k = \hat{\theta}_{k-1} + P_k \rho_k [y_k - \rho_k^T \hat{\theta}_{k-1}] \quad (9)$$

where:
$\rho_k$ is a vector of [2, 1] size with $$\rho_k = \begin{bmatrix} k \\ 1 \end{bmatrix}.$$

Each vector $\rho_k$ is such that its transpose $\rho_k^T$ corresponds to the $k^{th}$ row of the observation matrix $\Phi$ described above with regard to step 130;

$y_k$ is a scalar corresponding to the measurement $I_{ref}(k)$; and $P_k$ is a matrix of (2,2) size updated at each time increment k according to the expression:

$$P_k = P_{k-1} - \frac{P_{k-1} \rho_k \rho_k^T P_{k-1}}{1 + \rho_k^T P_{k-1} \rho_k}. \quad (10)$$

In the first iteration (k=1), an initial matrix $P_0$, with for example $$P_0 = \begin{bmatrix} 1 & 0 \\ 0 & 1 \end{bmatrix},$$

is employed.

If $\Phi_k$ is the observation matrix at the time k, of [k, 2] size, $$\Phi_k = \begin{bmatrix} 1 & 1 \\ \vdots & \vdots \\ k & 1 \end{bmatrix},$$

$P_k = (\Phi_k^T \cdot \Phi_k)^{-1}$. $P_k$ corresponds to the inverse of the autocorrelation matrix of the observation matrix $\Phi_k$.

$P_k$ and $\rho_k$ are quantities that are updated at each measurement time k and that allow the estimation $\hat{\theta}_k$ of the vector of parameters of the model at the time.

This embodiment is particularly advantageous because it allows the matrix $P_k$ to be expressed as a function of $P_{k-1}$, the expression of this matrix in a preceding iteration k−1, using equation (10). This does not require the matrix inversion that the preceding embodiment requires (see equation (5)).

In the first iteration, expression (9) is implemented considering an arbitrary initial vector of parameters $\hat{\theta}_0$, for example $$\hat{\theta}_0 = \begin{bmatrix} 1 \\ I_{ref}(k=0) \end{bmatrix}, k = 0$$

designating an initial measurement time.

Step 220 is illustrated in FIG. 4D. It comprises:
- a substep 222 of forming the vector $\rho_k$ on the basis of the measurement $I_{ref}(k)$;
- a substep 224 of updating the matrix $P_k$ by implementing expression (10) on the basis of the matrix $P_{k-1}$ obtained in a preceding iteration or, in the first iteration, of the initialized matrix $P_0$; and
- a sub step 226 of estimating the vector of parameters $\hat{\theta}_k$ with expression (9) based on the vector $\hat{\theta}_{k-1}$ obtained in a preceding iteration or, in the first iteration (k=1), on the initialized vector $\hat{\theta}_0$.

Step 230: Correcting the reference intensity.

The model parameterized in step 220 is taken into account to correct the reference intensity $I_{ref}(k)$, so as to obtain a corrected reference intensity $I'_{ref}(k)$. The correction consists in replacing the reference intensity with an application of the model according to the expression:

$$I'_{ref}(k) = \rho_k \hat{\theta}_k = a_k k + b_k. \tag{11}$$

Step 240: Estimating the amount $c_x(k)$ of the gaseous species analyzed.

This estimation is carried out on the basis of $I'_{ref}(k)$ and of I(k), analogously to step 150 described above.

Step 250: reiterating steps 210 to 240 or stopping the iteration. Steps 210 to 240 are reiterated until a number of iterations $N_k$ has been reached. In this example, $N_k = K = 2.6 \times 10^7$ iterations.

This embodiment is said to be recursive because it uses quantities $P_{k-1}$ and $\hat{\theta}_{k-1}$ obtained from the preceding iteration or, in the first iteration, initialized quantities. The vector of parameters $\hat{\theta}_k$ is updated on each iteration, this allowing, in each iteration, it to be taken into account to correct the reference intensity $I_{ref}(k)$ and to obtain the concentration $c_x(k)$ of the sought-after gaseous species.

Contrary to the embodiment described with regard to steps 100 to 150, it is not necessary to wait for a number $N_k$ of iterations to have been carried out before estimating the parameters of the model. This allows the reference intensity to be corrected in real time, and therefore the sought-after amount of the gaseous species to be determined in real time.

In addition, the updating formulae described with regard to step 220 are simple to implement and consume little memory.

According to one variant of this embodiment, a weighting term, or forgetting factor λ, may be provided so as to weight to what extent the preceding iteration is taken into account. In this variant, expression (10) is replaced by:

$$P_k = \frac{1}{\lambda}\left(P_{k-1} - \frac{P_{k-1}\rho_k \rho_k^T P_{k-1}}{\lambda + \rho_k^T P_{k-1}\rho_k}\right) \tag{12}$$

λ is a weighting term with $\lambda \in ]0,1]$. For example λ=0.99.

When λ=1, equation (12) is equivalent to equation (10).

Figure 5B:
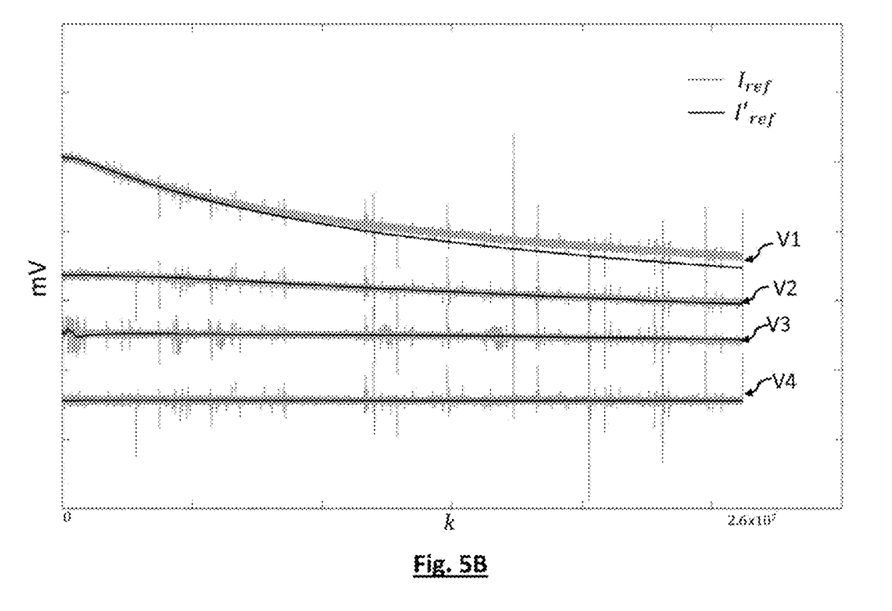
Figure 5C:
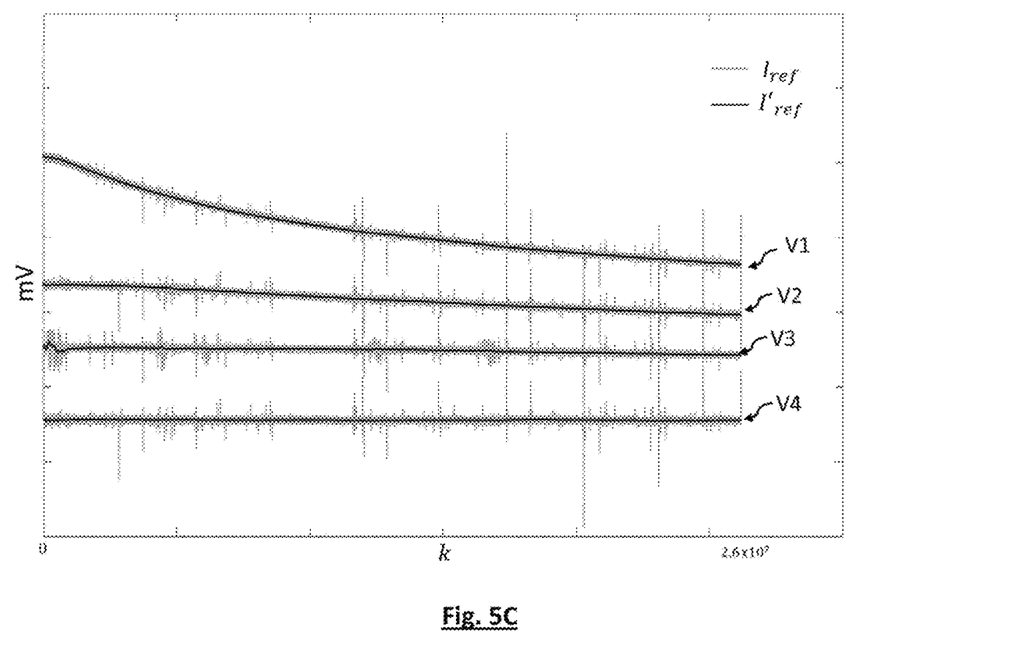

FIGS. 5B and 5C, respectively, show, for the various potentials to which the light source 11 was raised, measurements of the reference intensity $I_{ref}(k)$ and the corrected values $I'_{ref}(k)$ of the reference intensity resulting from the application of the recursive model without and with the weighting term taken into account. As may be seen in FIG. 5A, taking into account a model makes it possible to prevent fluctuations from affecting the reference intensity $I_{ref}$. In comparison to the non-recursive linear model, the performance of which is shown in FIG. 5A, the recursive model allows a better approximation of the reference intensity to be obtained and adapts to non-linear variations in the intensity. Taking into account a weighting factor allows an optimal performance to be obtained. Specifically, in FIG. 5C it may be seen that whatever the value of the potential to which the light source was raised, the corrected reference intensity $I'_{ref}$ is not at all noisy and exhibits no bias with respect to the measured reference intensity $I_{ref}$. This effect is particularly visible in the curve corresponding to the potential V1.

The curve comp2 of FIG. 3 shows a compensation of the intensity measured by the photodetector implementing the reference intensity corrected with the recursive estimation with a forgetting factor λ=0.99 taken into account, according to the expression:

$$comp(I(k)) = I_f(k) - \frac{I_f(k=0)}{I'_{ref}(k=0)} \times (I'_{ref}(k) - I'_{ref}(k=0)). \tag{2'}$$

Figure 2C:
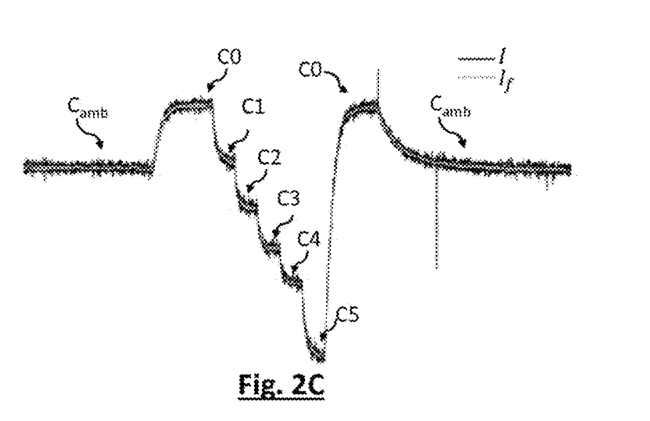
FIG. 2C shows a detail of FIG. 2B.

It may be seen that the intensity thus compensated for exhibits no significant fluctuations, the residual fluctuations corresponding to the series of measurements described with reference to FIG. 2C. Comparison of the curves comp2 and comp1 allows the effect of the decrease in fluctuations achieved via embodiments of the present disclosure to be appreciated.

The present disclosure will possibly be implemented on processors for processing data measured by gas sensors, for applications in environmental monitoring, but also in applications related to the measurement of gas in industrial environments or in medical applications.

The invention claimed is:

1. A method for measuring an amount of a gaseous species within a gas, the gaseous species absorbing light in an absorption spectral band, the method comprising:
   a) placing the gas between a light source and a measurement photodetector, the light source being configured to emit an incident light wave, the incident light wave propagating through the gas toward the measurement photodetector, the measurement photodetector being configured to detect a light wave transmitted by the gas, in the absorption spectral band;

b) illuminating the gas with the light source;

c) measuring, with the measurement photodetector a measurement intensity of the light wave transmitted by the gas, in the absorption spectral band;

d) measuring, with a reference photodetector, a reference intensity, of a reference light wave, the reference light wave being emitted by the light source in a reference spectral band;

b) to d) being implemented at a plurality of measurement times, the method further comprising:

e) correcting the reference intensity detected at the various measurement times; and f) estimating an amount of the gaseous species, at the various measurement times, from the reference intensity corrected in and from the measurement intensity resulting from c);

wherein e) comprises:
  ei) taking into account a parametric model, defined using parameters, the parametric model modelling a temporal variation in the reference intensity detected at the various measurement times, the temporal variation expressing a decrease in the reference intensity;
  eii) estimating the parameters of the model using the reference intensities measured at the various measurement times; and
  eiii) estimating a corrected reference intensity at each measurement time depending on the estimated parameters of the model.

2. The method of claim 1, wherein, in ei), the model taken into account is a linear model, eii) forming a linear regression.

3. The method of claim 1, wherein b) to d) are carried out at various measurement times forming a time range, and wherein, following these measurement times:
  in ei), the model is taken into account for the time range;
  in eii), the parameters of the model are estimated using reference intensities measured during the time range; and
  in eiii), the corrected reference intensity is estimated for the measurement times of the time range.

4. The method of claim 3, wherein, in eii), each measurement time of the time range is assigned a weighting term that is strictly positive and lower than or equal to 1.

5. The method of claim 1, wherein eii) and eiii) are implemented for each measurement time, iteratively, the parameters of the model being updated depending on parameters of the model resulting from a preceding iteration, or, at a first measurement time, from initialized parameters.

6. The method of claim 5, wherein e) and f) are implemented at each measurement time.

7. The method of claim 5, wherein eii) comprises taking into account a weighting term that is strictly positive and lower than or equal to 1 to weight to what extent the preceding iteration is taken into account.

8. The method of claim 1, wherein f) comprises the following substeps:
  fi) from the corrected reference intensity, at each measurement time, estimating an intensity of the light wave emitted by the light source, in the absorption spectral band, at the measurement time;
  fii) comparing the intensity thus estimated with the measurement intensity resulting from c), at the measurement time; and
  fiii) estimating the amount of the gaseous species depending on the comparison carried out in fii).

9. A device for determining an amount of a gaseous species in a gas, the device comprising:
  a light source configured to emit an incident light wave that propagates toward the gas, the incident light wave lying in an absorption spectral band of the gaseous species;
  a measurement photodetector configured to detect a light wave transmitted by the gas, at various measurement times, and to measure a measurement intensity thereof;
  a reference photodetector configured to measure a reference intensity; of a reference light wave emitted by the light source, at the various measurement times;
  a first processor, for computing a corrected reference intensity at the various measurement times, from the reference intensity measured by the reference photodetector the measurement times, the first processor being configured to implement step e) of the method according to claim 1; and
  a second processor for estimating the amount of the gaseous species, at each measurement time, depending on the corrected reference intensity and the measurement intensity, the second processor being configured to implement step f) of the method according to claim 1.

10. The device of claim 9, wherein the first processor and the second processor form a single processor.

* * * * *

UNITED STATES PATENT AND TRADEMARK OFFICE
CERTIFICATE OF CORRECTION

PATENT NO.         : 11,041,801 B2
APPLICATION NO.    : 16/622703
DATED              : June 22, 2021
INVENTOR(S)        : Mayoue et al.

Page 1 of 1

It is certified that error appears in the above-identified patent and that said Letters Patent is hereby corrected as shown below:

In the Claims

| | | | |
|---|---|---|---|
| Claim 1, | Column 13, | Line 8,  | change "intensity," to --intensity-- |
| Claim 1, | Column 13, | Line 12, | change "times, the method further comprising:" to --times, the method further comprising:-- |
| Claim 1, | Column 13, | Line 17, | change "in and" to --in e) and-- |
| Claim 9, | Column 14, | Line 32, | change "intensity; of" to --intensity of-- |
| Claim 9, | Column 14, | Line 37, | change "detector the" to --detector at the-- |
| Claim 9, | Column 14, | Line 41, | change "processor for" to --processor, for-- |

Signed and Sealed this
Twenty-fourth Day of August, 2021

Drew Hirshfeld
*Performing the Functions and Duties of the
Under Secretary of Commerce for Intellectual Property and
Director of the United States Patent and Trademark Office*